United States Patent [19]

Grone et al.

[11] Patent Number: 4,627,886
[45] Date of Patent: Dec. 9, 1986

[54] COMPOSITE TAPE LAYING MACHINE WITH PIVOTING PRESSER MEMBER

[75] Inventors: Robert J. Grone, Elsmere, Ky.; Michael N. Grimshaw, Loveland, Ohio

[73] Assignee: Cincinnati Milacron Inc., Cincinnati, Ohio

[21] Appl. No.: 739,359

[22] Filed: May 30, 1985

[51] Int. Cl.$^4$ ............................................. B32B 31/00
[52] U.S. Cl. ..................................... 156/361; 156/486; 156/488; 156/523; 156/526; 156/574
[58] Field of Search ............... 156/523, 525, 526, 574, 156/577, 522, 361, 353, 350, 486, 358, 488

[56] References Cited

U.S. PATENT DOCUMENTS

| | | | |
|---|---|---|---|
| 3,574,040 | 4/1971 | Chitwood et al. | 156/522 |
| 3,775,219 | 11/1973 | Karlson et al. | 156/526 |
| 3,810,805 | 5/1974 | Goldsworthy et al. | 156/525 X |
| 4,461,669 | 7/1984 | Dontscheff | 156/577 X |
| 4,557,783 | 12/1985 | Grone et al. | 156/523 X |

Primary Examiner—David Simmons
Attorney, Agent, or Firm—Thomas M. Farrell

[57] ABSTRACT

The tape laying head of a composite tape laying machine is rotatable around the tape laydown surface on circular guideways. The presser shoe assembly is likewise rotatable around the common radius point by means of circular cam faces journalled on cam followers supported by the tape head presser assembly. A feedback transducer signals rotation of the tape presser member while adapting to contour changes, and the signal is employed to effect rotation and realignment of the entire tape head with the presser shoe. The mechanism additionally embodies a brake assembly which is selectively energized to prevent presser shoe rotation at predetermined times.

9 Claims, 17 Drawing Figures

MODIFIED PRIOR ART

MODIFIED PRIOR ART

MODIFIED PRIOR ART

COMPOSITE TAPE LAYING MACHINE WITH PIVOTING PRESSER MEMBER

BACKGROUND OF THE INVENTION

The invention relates generally to machines utilizing a tape head for laying composite tape on a surface.

In particular, the invention relates to tape laying machines where the tape laydown surface is contoured.

Composite tape laying machines are becoming well-known, especially in the aerospace industries. Such machines typically utilize a tape laying head which is movable on machine slides with respect to a mold or table laydown surface. As an example of the art, the tape head first dispenses parallel rows of composite tape and presses them to the laydown surface. Next the head may be rotated to form oriented plys of tape to build a laminated structure with anisotropic strength, where required.

The early form of tape laying machine dispensed composite tape plys to a flat mold surface to build up a part and, thereafter, the flat structure was then moved to a press to impart desired surface contours to the finished part. As tape laying art evolved, the capability for laying tape strips on contoured or shaped surfaces, as well as flat, was embodied in machine hardware and control functions. One popular style of machine utilizes a gantry or bridge which spans, and runs on, machine slideways which are held parallel to an elongate laydown surface. The tape head gantry also embodies means for driving the head transversely across the laydown surface and for swiveling the head so that angularly-biased plys can be laid. A tape head basically embodies a plate-like structure for supporting both a supply reel of composite tape and take-up reel for accumulating backing paper from the tape assembly as the tape is deposited on the laydown surface. The reels have horizontal axes and the tape is trained under a presser member. In one instance, the presser member might be a smooth shoe having line-contact transversely across the tape. In another instance, the presser member might be a cylindrical roller to compact the tape.

Several prior art references are illustrative of machine structure aimed at laying composite tape to a surface of changing contour, namely:

U.S. Pat. No. 3,574,040, Apr. 6, 1971 of B. E. Chitwood et al;

U.K. Patent Appln. No. GB2,101,519A, published Jan. 19, 1983 of W. J. Murray et al;

U.S. Pat. No. 4,461,669, July 24, 1984 of H. Dontscheff.

U.S. Pat. No. 3,574,040, assigned to the General Dynamics Company, describes a traveling tape laying head wherein the entire head-tape reels, cutting assembly, and roller foot may be rotated around an axis lying along the tape laydown surface, by swiveling the assembly on an arcuate way system having a radius of curvature swung from the laydown surface. One disadvantage to the device is that the pressure roller is rigidly aligned with the tape head so that the entire head must be rapidly positioned in response to proximity sensors in order to adapt the pressure roller to surface contour changes. The large mass of the head may inhibit the speed with which the machine can adapt to contour changes.

U.K. Patent Appln. No. GB2,101,519A, assigned to the Vought Corporation, covers the so-called "Vought machine" or concept, which has been widely covered in trade publications covering the advanced composite tape laying machine developed by the Vought Corporation. Several articles include:

Jan. 24, 1983 issue of Desizn News. on pages 136 and 137, entitled "CNC Machine Slashes Composite Cost"; and October, 1984 issue of *Machine and Tool Blue Book*, pages 74–78, entitled "Automation Takes Aim At Composites Manufacturing".

Part of the Vought concept is to provide for an independent pivot motion of the tape laying shoe on the tape head. However, the shoe pivots around a pivot point located above the tape laydown surface, so that the shoe has a pendulum-type mounting—but is being pushed downward, from overhead weight. A pair of side potentiometers are affixed to the shoe and head to indicate relative motion as the lightweight shoe quickly adapts to contour changes. The sensed movement is fed back to a servodrive system to rotate the much heavier-weight tape head on an arcuate way system having a radius of curvature swung from the tape laydown surface.

One disadvantage to the Vought head and its shoe mounting arrangement is that, when the head descends to a contour surface which is not normal to the direction of descent, a corner of the shoe will immediately press the tacky tape to the laydown surface. Next, as the shoe pivots about the upper pivot pin, the shoe will slip across the tape surface to properly align with the contour surface. The tape, already stuck to the surface upon touchdown, is thereby starting to lay down out of position. This condition tends to be avoided if the shoe wobbles about an axis on the tape laydown surface.

Another feature of the Vought device is that counterbalance cylinders are used to control the downward force of the head, and are mounted on the pivotable head, so that the presser force is substantially normal to the contour. The head is split into a first section pivotable about the tape surface, and a second section which slides radially on the first section to allow for some "float" normal to the contour. While maintaining normal forces may be desirable, a disadvantage condition arises since the presser shoe can move radially from the point of zero radius established by the arcuate head track, so that the shoe may, in some instances slip from side-to-side on the tape as the head is pivoted.

U.S. Pat. No. 4,461,669, assigned to the Boeing Company, discloses a rudimentary design for a tape head which has the advantage of pivoting the presser foot about the tape laydown surface. The gist of the disclosure is that the lower presser member is pivoted on a plate which is attached to an upper control plate by a vertical parallel linkage framework, all carried on a tape head. By virtue of the parallel linkage therefor, as the control plate is pivoted, the presser member plate will also pivot, all rotation of the two being identical. Therefore, the pivot point of the control plate is manifested as a virtual pivot point on the presser member plate at the tape surface. However, certain disadvantages are seen in this mechanism, namely: while the disclosure refers to the Vought machine as requiring the entire mass of the head be pivoted on the machine ways, the parallel linkage mechanism similarly must pivot the masses of both tape reel assemblies as well as the cutter mechanism, all together with the presser plate. If these members are not all carried in pivotal relationship with the presser member, the tape would be trained from one reel to the other, intending to remain parallel to a plane parallel to the axes of the reels, while the pivoted presser member would impress on an outside edge of the tape, thus causing unequal stresses in the tape and a poor laydown condition. Another disadvantage of the system is that it may be difficult to practically manufacture and maintain the parallel link bars. Additionally, and unlike the Vought head, the force-directing pistons remain aimed at the original plane of the tape, so that when the presser member is swiveled, a vector component arises when applying a downward force with the pistons, so that the presser member and/or tape may tend to slide sideways along a sloped surface.

By way of clarification, it should be noted that while an extensive discussion of the Vought machine is embodied in the Background of the U.S. Pat. No. 4,461,669, the prior art schematic depicted in FIG. 7 of that patent does not, in fact, depict the pendulous pivoting shoe concept of the Vought machine, nor does the background of that invention mention the pivoting shoe of Vought. The prior art picture more closely resembles the General Dynamics machine wherein the presser member and tape head are rigidly tied to one another for unitary pivoting.

Applicant has obviated certain shortcomings inherent in the prior art devices by a construction wherein the presser member and tape head are concentrically rotatable around a point on the tape surface. The tape presser member has a circular way and follower system coupled to the tape head, and the tape head has a circular way and follower system coupled to the tape head carrier system. Sensor members detect initial rotation of the presser member in response to contour changes, and the sensor signal is utilized to effect a servodrive to move the tape head into alignment with the presser member. Thus, a rugged, reliable, and quickly adaptable system is provided to accommodate contour changes of the tape laydown surface.

The rotatable presser member is also provided with a brake to inhibit relative movement between the presser member and tape head at predetermined times, such as when the tape is being applied at an edge of a mold, and the presser member is not to rotate around or tip over the corner or a mold.

It is therefore, an object of the present invention, to provide for a presser member in a tape head system which is quickly adaptable to follow contour changes of a tape laydown surface.

Another object of the present invention is to provide for a relatively simple system for accommodating surface contour changes on a tape laydown surface, keeping the presser member normal to the tape surface.

Still another object of the present invention is to provide a tape laydown unit which will allow the tape presser member to freely follow contour changes of the tape laydown surface at selected intervals, and wherein the presser member may be braked, and thus not pivot, relative to the tape head at predetermined times.

SUMMARY OF THE INVENTION

The invention is shown embodied in a laminating machine having a head carrying a presser member for pressing a strip of tape material against a contoured surface, for example, a mold, to apply it to the surface along a path, wherein the machine includes means for mounting the head for pivotal movement about the path and where the head and presser member are aligned along a common line substantially normal to the path and passing through a point on the path, apparatus for mounting the presser member for pivotal movement about the path comprising an arcuate cam means, for example, a circular track and follower, for connecting the presser member to the head and thus for allowing pivotal movement of the presser member about an axis parallel to said path and passing through said point, wherein the presser member pivotal movement is independent of the head pivotal movement; and means for realigning the head with the presser member after said member is pivoted about said axis. In the preferred embodiment, the means for realigning the head includes a head drive means cooperating with a presser member positioned sensing means. Also embodied in the preferred embodiment is a brake member for selectively inhibiting rotation of the presser member relative to the head.

BRIEF DESCRIPTION OF THE DRAWINGS

FIG. 3a is a close-up perspective view of the modified prior art tape head of FIG. 2a.

FIG. 4a is a front elevational view of the modified prior art tape head, taken along the line 4a—4a of FIG. 2a.

FIG. 5 is a perspective view of a high rail gantry machine for carrying substantially the same tape head of FIG. 2a.

Prior Art—The Vought Machine

Figure 1:
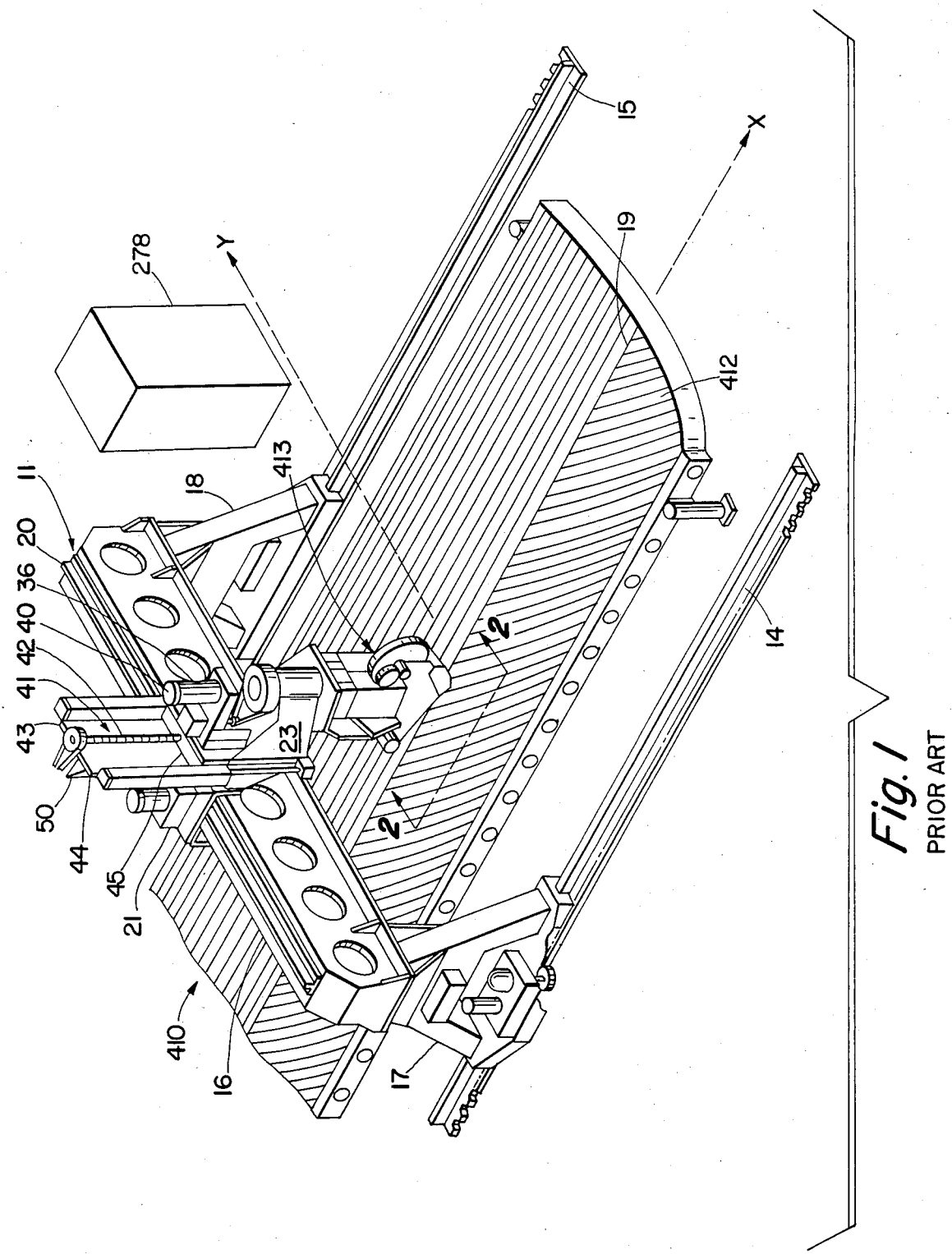
FIG. 1 is a perspective view of a prior art tape laying machine.

FIG. 1 of the drawings, depicts the Vought machine alluded to previously, the subject of U.K. Patent Appln. No. GB2,101,519A published Jan. 19, 1983. While certain features of the machine will be hereinafter described with the original reference numbers, the entire U.K. patent application is incorporated herein by reference and further description and details of that machine, in particular the tape laying head, may be had by reference to the incorporated document.

In FIG. 1, the prior art tape laying machine 410 is shown as including a gantry 11 extending over a mold or work table 412. The gantry 11 includes means for movably supporting a tape laying head assembly 413.

First and second tracks or ways 14,15 are positioned in mutually parallel alignment extending perpendicularly of the gantry 11 on either side of the work table 412. Movement of the tape applicator head 413 along the gantry 11 relative to the work table 412 is denoted by movement along the "Y-axis", and movement in the direction parallel to the tracks 14,15 is termed "X-axis" movement. For convenience, the tracks 14,15 are termed herein the left and right, "X-axis tracks". The gantry 11 includes an elongated beam 16 of generally rectangular cross-section supported at its end portions by left and right gantry pedestals 17,18 which are movably supported on the tracks 14,15 by means of internal rollers, not shown, suitably of the type known in the art as Thompson round way rollers, whereby the pedestals may be translated along the X-axis tracks. Movement of the gantry 11 along the X-axis tracks 14,15 and/or movement of the tape laying head assembly 413 along the gantry beam 16, when the tape laying head assembly 413 is in contact with the work table or the surface of the mold 412, results in the dispensing of lengths of the fibrous composite tape 19 from the assembly 413, and in the placement and adhering of the tape 19 to the work surface of mold 412 along a desired path of the X and Y axis, as will be disclosed in the description to follow of the tape head assembly 413.

A gantry saddle assembly 21 is provided for carrying the tape head assembly 413 along the gantry beam 16 on the Y-axis track 20 in a manner well-known in the art.

Translation of the tape head assembly 413 vertically or in the "Z" axis as shown in FIG. 1 is accomplished by a Z-axis drive mechanism 41 which includes a threaded drive shaft 42 that extends downwardly from a bearing support 43 mounted on a vertically extending slide plate 44 affixed to a side portion of Y-axis saddle assembly 21. The Z-axis threaded drive shaft 42 extends downwardly within a housing 45 to which the tape head mounting yoke structure 23 is affixed and the drive shaft 42 is threadably engaged within corresponding internally threaded block members mounted within the Z-axis housing 45. The threaded shaft 42 is drivingly connected to a Z-axis DC servomotor 50 that is mounted on the Z-axis slide plate 44. A position sensor (not shown) is mounted on the drive motor 50 for generating position feedback signals corresponding to the degree of rotation of the drive motor 50 and the threaded drive shaft 42. The rotation of the threaded drive shaft 42 results in vertical movement of the housing 45 upon the shaft 42 and thus, in vertical displacement of tape laying head assembly 413.

Figure 2:
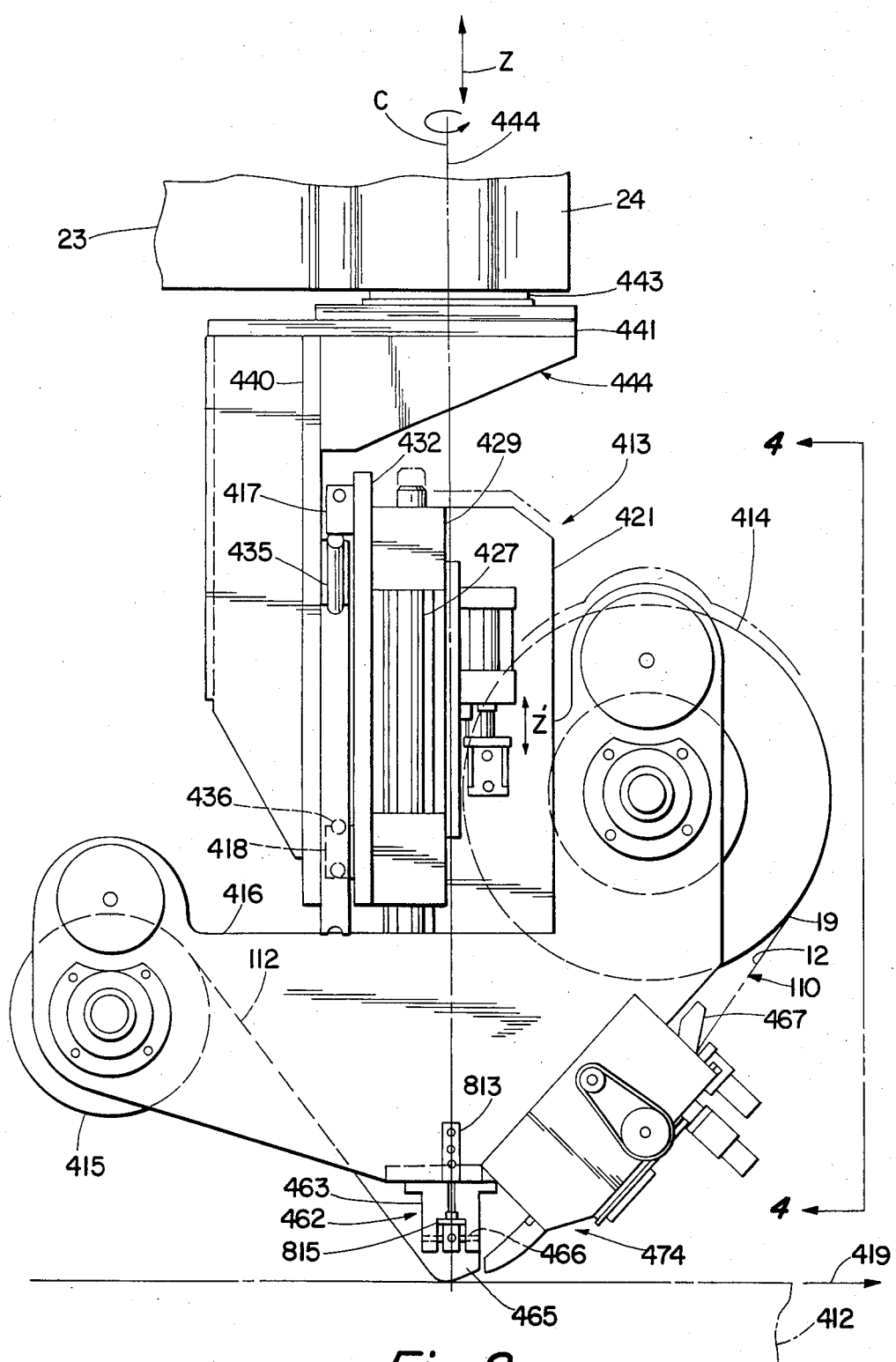
FIG. 2 is a side elevational view of the prior art tape laying head taken along the line 2—2 of FIG. 1.

Further reference to FIG. 1 and FIG. 2 shows that the tape laying head assembly 413 is rotatably mounted to the Y-axis saddle assembly 21 by a mounting yoke structure 23 which supports and encloses a dual bearing assembly 24, in which a vertical shaft 443 is rotatably journalled for permitting rotation of the shaft 443 about a substantially vertical axis 444, termed herein the "C" axis. A DC drive motor 36 is mounted on an extension of the yoke structure 23 and is connected through a suitable drive train to effect controlled rotation of the tape laying head assembly 413. A position sensing feedback transducer 40, capable of generating a signal corresponding to the rotational position of the C-axis shaft 443, is driven by the C-axis drive motor 36 for providing an electrical output signal corresponding to the degree of rotation of the motor shaft, whereby the C-axis position of the tape laying head assembly 413 may be monitored and controlled by a control means 278.

With reference to FIG. 2, the tape laying head assembly 413 includes a tape supply and feed reel 414 and take-up reel 415, both mounted on a rigid mounting plate structure 416. A composite tape structure 110 contained in the feed reel 414 comprises the pre-impregnated fibrous tape 19 and a backing strip 112. The fibrous tape 19, for example, may be a tape of suitable width formed with unidirectional graphite fibers, impregnated with an uncured epoxy resin. The backing strip 112, for example, may suitably be of waxed paper of 60-80 pounds per thousand square feet. The tape structure is suitably formed on cardboard spools (not shown). The plate structure 416 is affixed in parallel relationship, to a left, vertical support plate 421 which is affixed to a left vertical shaft 427 longitudinally slidable within upper and lower linear bushing assemblies 429,430, which in turn are affixed in vertical alignment to a backing plate 432.

Continuing to refer to FIG. 2, an applicator shoe assembly 462 is mounted to the plate structure 416 at its central, lower portion, the shoe assembly 462 having a downwardly-projecting mounting block 463 mounted on the plate structure 416, the mounting block 463 having a longitudinal slot, extending perpendicularly of the plate structure 416 and open downwardly, for receiving an applicator shoe insert 465 of a low friction material such as Teflon, a DuPont Corp. trademark for polytetraflouroethylene (PTFE) plastic, having an arcuate, convex, lower cross-sectional surface. A bolt 466, having a stepped threaded end portion of reduced diameter, is extended through the mounting block 463 (suitably made of aluminum), and the insert 465 is engaged within a stepped bore formed in the block 463, for permitting limited rocking movement of the shoe 465 about the axis of the bolt 466 to accommodate irregularities in the mold surface 412.

A guide chute 467 is mounted between the plate structures 416 and 471 (FIG. 4) in alignment with the supply reel 414 and the applicator shoe 465. The plate structure 416 supports a cutter assembly 474 which cooperates with the guide chute 467 to guide the tape structure along the chute track and through the cutter assembly 474 to the shoe assembly 462.

Figure 4:
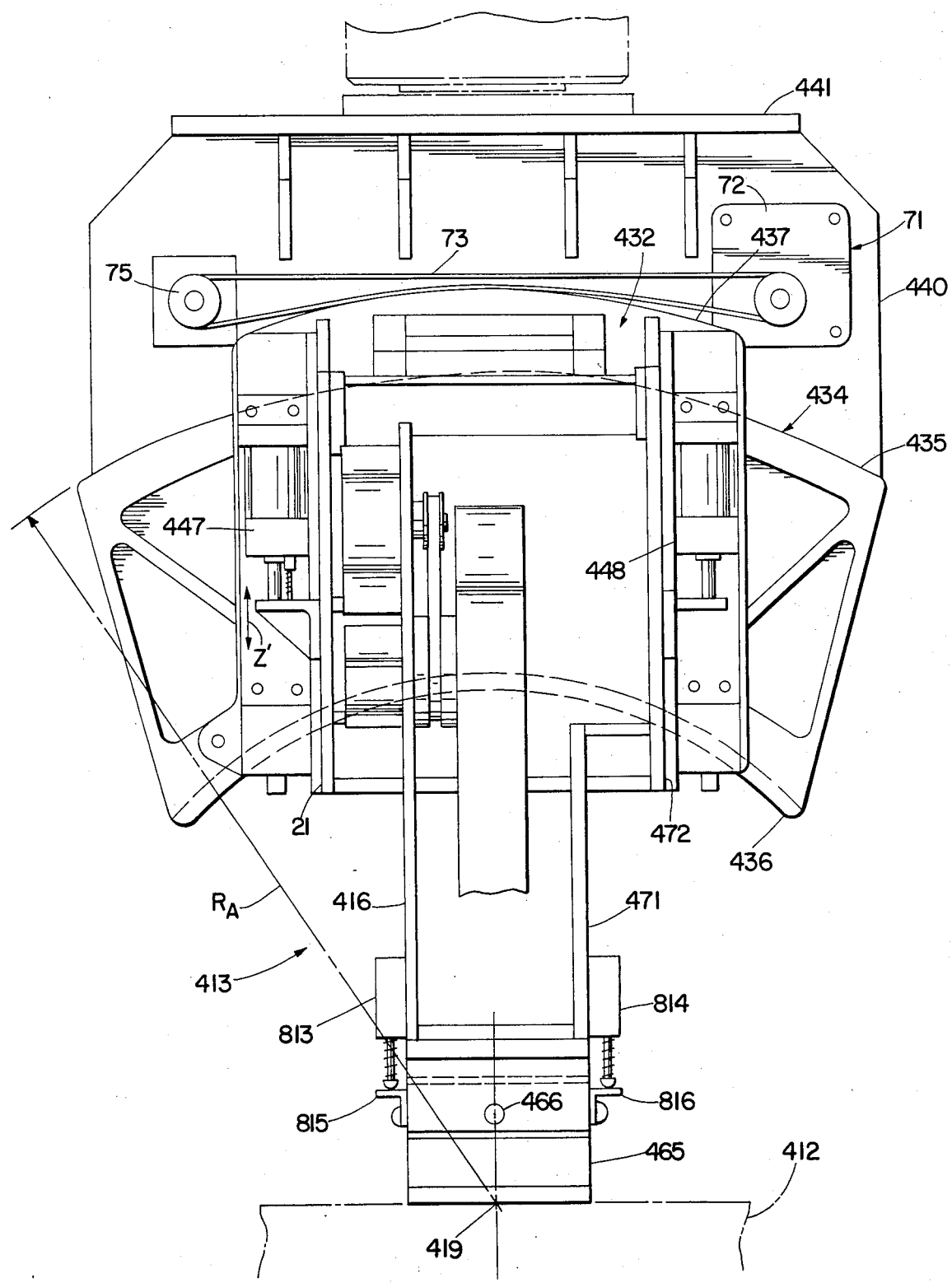
FIG. 4 is a front elevational view of the prior art tape head, taken along the line 4—4 of FIG. 2.

The elevational view of FIG. 4 is shown with the cutter assembly 474 and guide chute 467 removed for clarity. Movement of the shoe 465 about the bolt 466 is detected by linear potentiometer sensors 813 and 814 mounted on flanges 815 and 816 that are connected to the left and right side, respectively, of the shoe 465.

Figure 3:
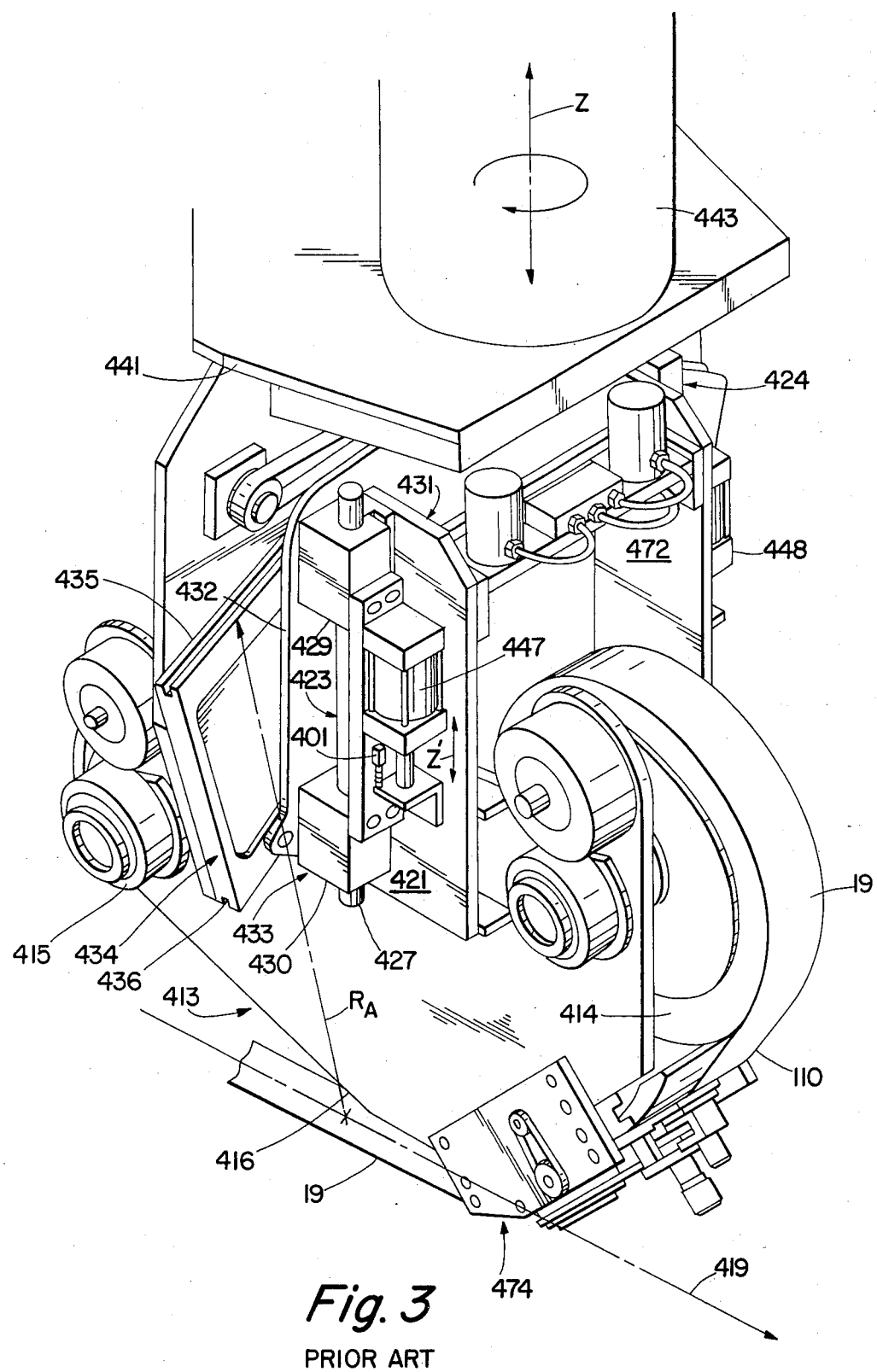
FIG. 3 is a close-up perspective view of the prior art tape head of FIG. 1.

Referring to FIG. 3, the tape head frame structure, 431 which is a fabricated assembly of plates including the plate structure 416, is connected to the vertical backing plate 432 by means of left and right vertical bushing assemblies 423,424. The tape head frame structure 431 is thus movable vertically relative to the backing plate 432, for accommodating minor vertical movements of the tape head 413. Here it may be noted that this minor vertical movement is variously referred to in the art as: "Z-axis float", "little Z", and "Z'".

Left and right pneumatic actuators 447,448 are connected to left and right bushing assemblies 423,424, and extend downwardly alongside left and right side plates 421,472. Respective left and right actuator rods 447(a),448(a) are connected to side plates 421,472 by means of angle brackets. During operation, air under pressure is applied to the actuators 447,448, which tends to counterbalance, or exert an upward force on, the tape laying head assembly 413 for controlling the pressure of the head assembly 413 upon the mold surface 412. Servocontrol means 401 provided for sensing the vertical position of the tape head frame structure 431 relative to the backing plate 432 and for actuating the Z-axis drive motor 50 to raise or lower the tape laying head assembly 413 as a unit. Actuators 447,448 and associated components thus comprise a means for controlling the degree of pressure exerted upon the composite tape 110 by opposing, to a predetermined degree, the downward force produced by the weight of the tape laying head assembly 413.

Referring to FIGS. 2, 3, and 4, the tape head supporting frame work includes a vertical stiffback plate 440 extending downwardly from a horizontally extending top plate 441 affixed to shaft 443.

The tape laying head assembly 413 is pivotally connected to the stiffback plate 440 by an R-axis mounting assembly 433 permitting rotational displacement of the head assembly 413 about an R-axis 419. R-axis 419 is aligned with the tape laying head assembly 413 and when the assembly 413 is aligned with the X-axis as shown in FIG. 1, extends parallel to the X-axis and centrally intersects the tape head assembly 413 adjacent its lowermost position, i.e. at its intersection with the mold structure 412. R-axis movement of the tape head assembly 413 is permitted about an arcuate frame work 434, defining upper and lower arcuate tracks 435,436, which is affixed to the vertical stiffback plate 440. The tape laying head assembly 413 has a rigid backing plate 432 having upper and lower recirculating ball bearing assemblies 417,418, adapted to mate with the upper and lower arcuate tracks 435,436, respectively, for permitting arcuate movement of the backing plate 432 relative to the tracks 435,436, and thereby permitting arcuate movement about the R-axis 419 of the tape laying head assembly 413.

An R-axis drive mechanism 71, (FIG. 4), includes a reversibly rotatable DC servomotor 72 mounted on the stiffback plate 440. An R-axis timing belt 73 connected to a driving pulley 78 on the motor 72, extends along the stiffback plate 440 over and in engagement with an arcuate driven surface 437 of the backing plate 432, and is looped around a corresponding pulley 75 mounted on the opposite side of the stiffback plate 440 in alignment with the surface 437 and the drive motor 72. Rotation of the drive motor 72 in a clockwise direction, as viewed in FIG. 4, causes leftward movement of the lower section of the timing belt 73 and thereby effects counterclockwise arcuate movement of the backing plate 432 and the tape head assembly 413, upon the upper and lower tracks 435,436.

It can thus be seen that as the head assembly 413 rotates around the R-axis 419, the shoe pressure, controlled by the counterbalance cylinders 447,448, will remain normal to the tape surface. The upper track 435, of reference radius "$R_a$", will be correctly positioned above the surface 412 by the Z-axis drive motor. However, when the tape laying head assembly 413 must rotate to adapt to contour changes, any Z' movement (float) then experienced by the shoe assembly 462 may raise the shoe insert 465 radially above the point of zero radius of the upper track 435. In such event, the shoe insert 465 may actually translate sideways over a curved path, rather than pivoting about the tape surface.

Description of the Preferred Embodiment Modified Prior Art

In order to keep the tip of the presser foot or shoe insert 465 at a point of zero radius to insure that it will rotate on the tape surface, a commercial modified form of the Vought machine tape laying head has been marketed by Cincinnati Milacron Inc., assignee of the present invention and licensee of the Vought technology.

Figure 2A:
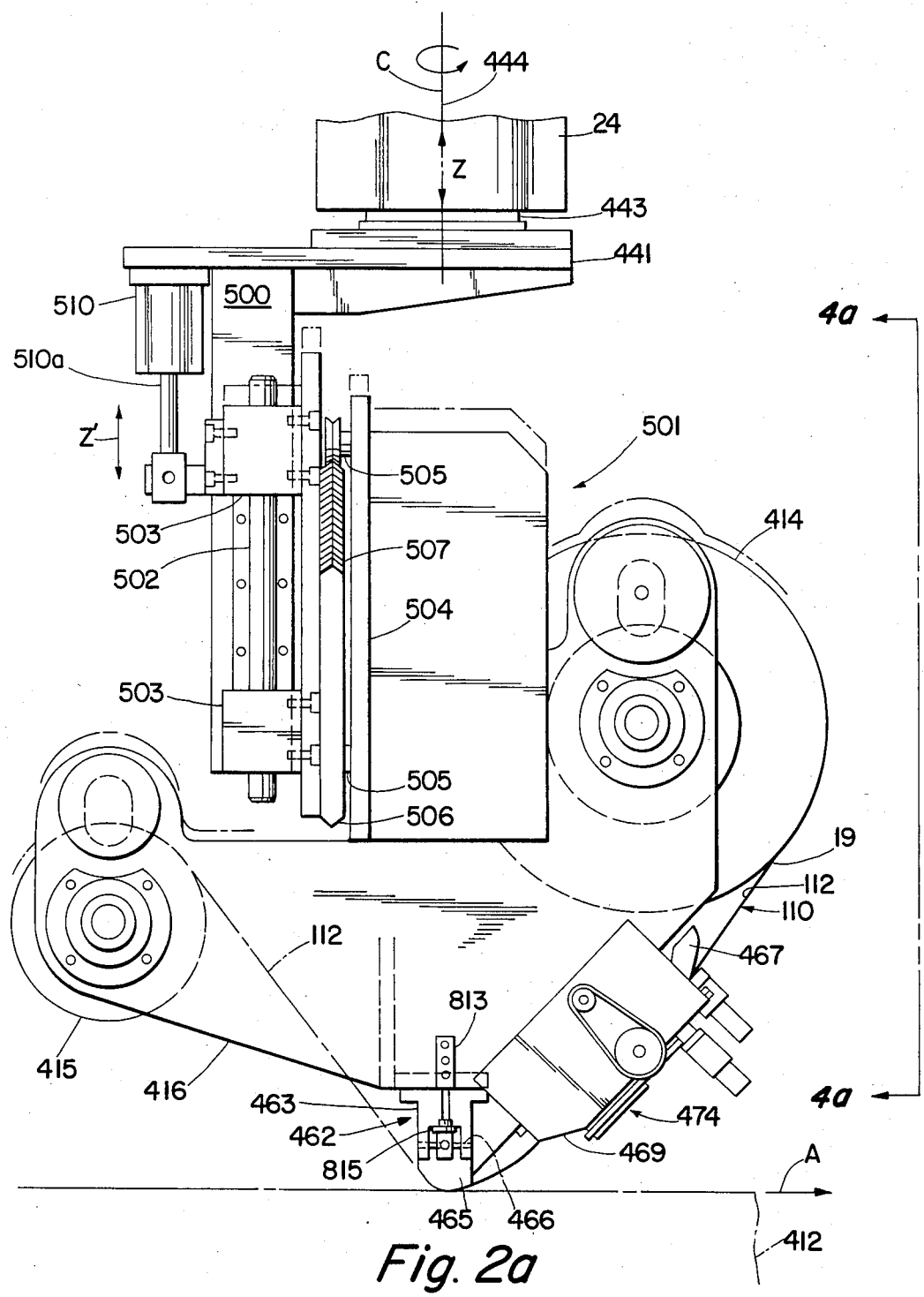
FIG. 2a is a side elevational view of a modified prior art tape head.

Referring to FIG. 2a, the top plate 441 is affixed to a depending vertical stiffback plate 500 (a fabricated box structure). The stiffback plate 500 is coupled to the tape head 501 left and right (not shown) vertical bars 502 affixed to the stiffback plate 500 and ball bushing assemblies 503 affixed to the head 501. The head 501 is comprised principally of the main side plate structure 416 affixed to a vertical backing plate 504. The backing plate 504 is carried by rollers 505 in contact with the arcuate V-ways 506,507 of a radius plate 508. The radius plate 508 is bolted to a vertical mounting plate 509 which, in turn is bolted to the ball bushing assemblies 503. Left and right (not shown) fluid actuators 510 are affixed to the top plate 441 while the actuator rods 510a are affixed to the upper ball bushing assemblies 503 to counterbalance the weight of the head 501 and to permit Z' movement or float.

Figure 3A:
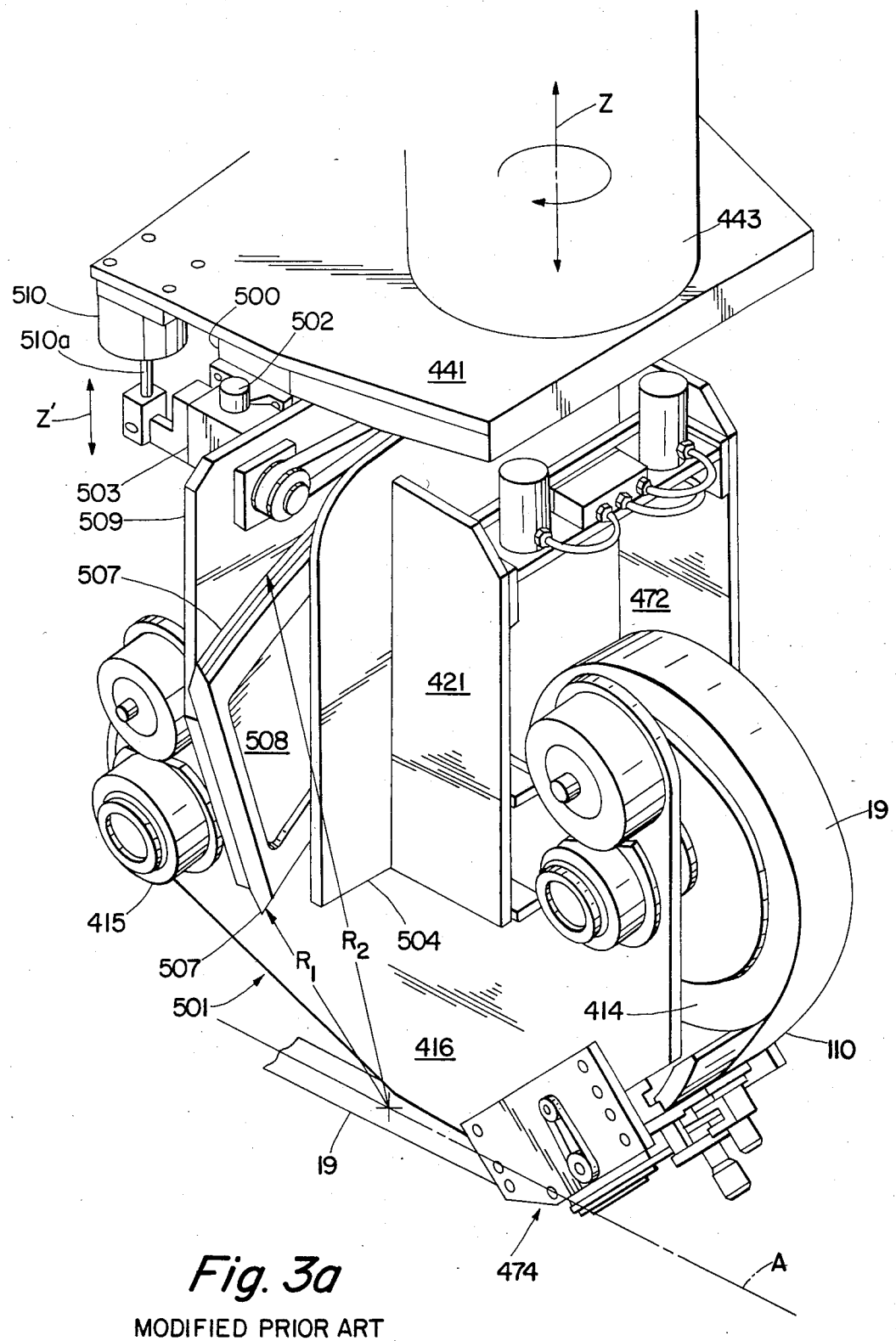
Figure 4A:
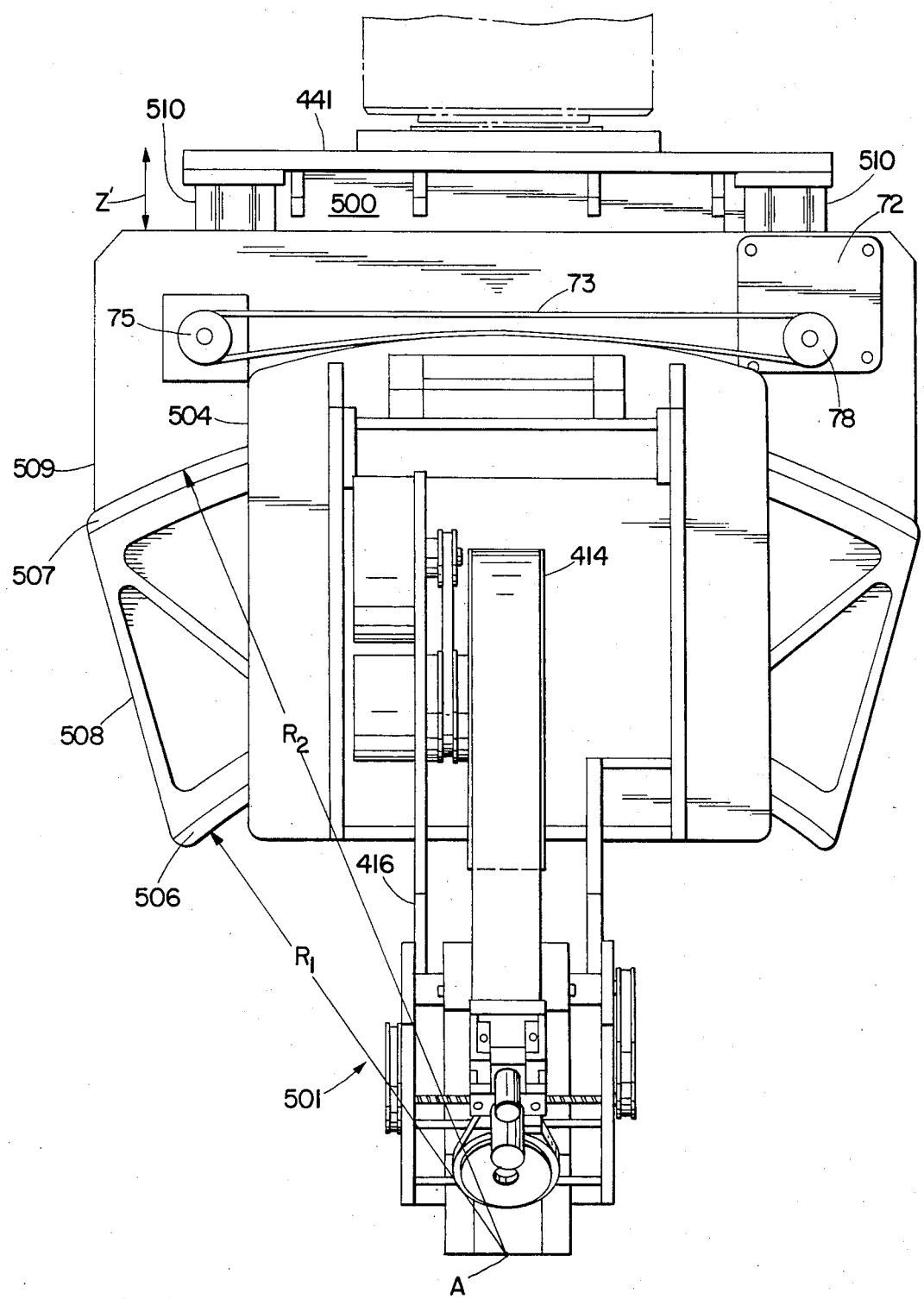

Referring to FIG. 3a and 4a, the reference axis of the tape path has been re-designated as the "A-axis". Thus, it can be seen that by allowing the radius plate 508 to float, as the tape head 501 travels along the A-axis, the shoe assembly 462 will always ride on the point of zero radius, i.e., the point from which the arcuate ways 506,507 of radius $R_1$ and $R_2$, are generated.

The assembly does not maintain all forces normal to the tape surface, since the actuators 510 are vertically fixed, rather than movable on the radius plate 508. However, for light loads and small rotation angles, this embodiment has proved satisfactory.

High Rail Gantry Machine

Figure 5:
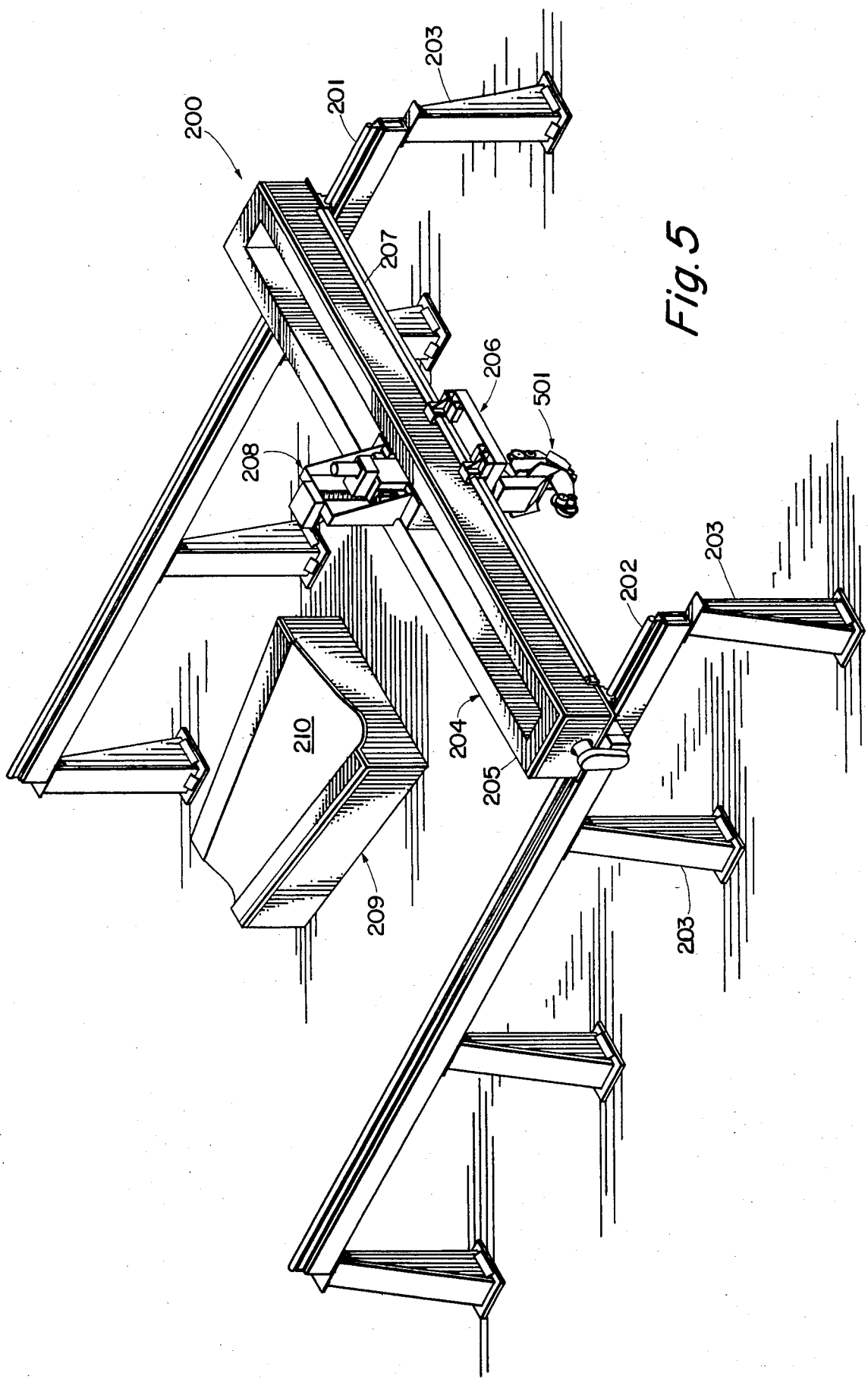

Referring to FIG. 5 of the drawings, a composite tape laying machine 200 is depicted. The machine 200 is manufactured by Cincinnati Milacron Inc., the assignee of the present invention, and a licensee under the Vought machine technology depicted in FIG. 1. The machine 200, while embodying many of the design features of the Vought machine 410 is configured as a "high rail" gantry machine, i.e., the side rails, or tracks 201,202 which are parallel to the X-axis are elevated on columns 203 above the floor line to provide easy traffic patterns for personnel and equipment. The gantry 204 includes an elongated bifurcated beam 205 which spans the X-axis tracks 201,202. A tape laying head 501 of substantially the modified prior art Vought machine design, FIG. 2a, is rotatably mounted to a Y-axis saddle assembly 206 carried on a Y-axis track 207 for transverse movement along the beam 205. The Z-axis drive mechanism 208 extends from the saddle assemlby 206 upward through the bifurcated beam 205. An exemplary mold structure 209 is positioned between the side tracks 201,202 to present a tape laydown surface 210 of varying configuration to the tape laying head 501. The coordinate movements of the tape laying head 501 are substantially identical to those shown in the prior art machine 410 of FIG. 1.

Presser Member Assembly

Figure 6:
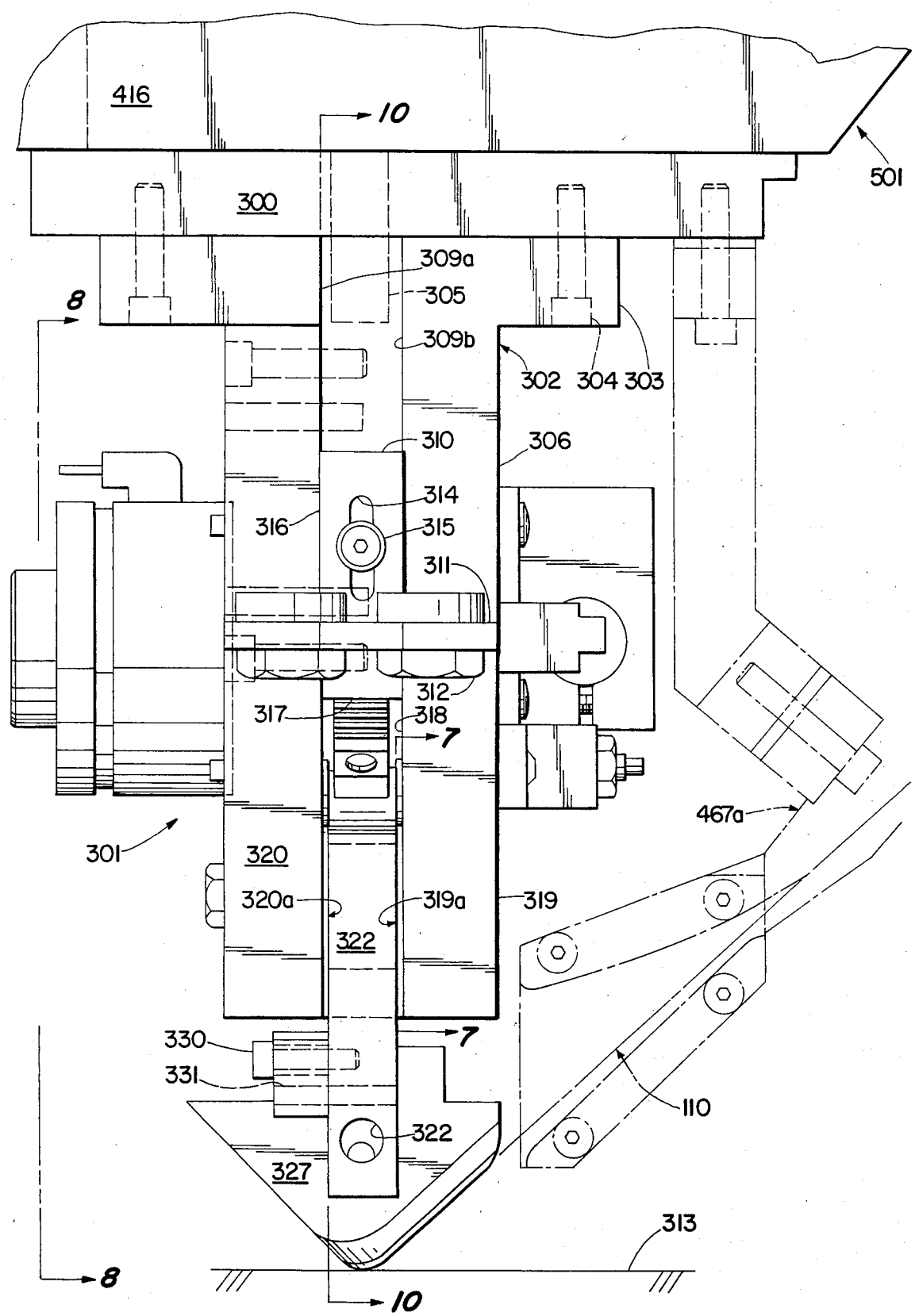
FIG. 6 is a side elevational view of the tape head of FIG. 5.
Figure 7:
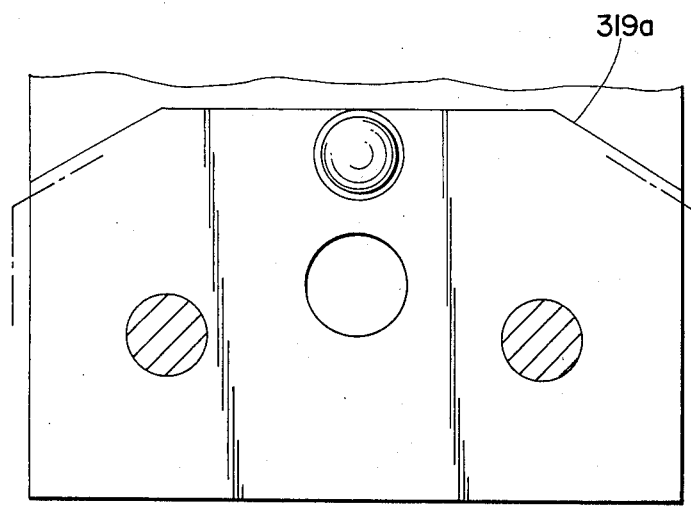
FIG. 7 is an elevational section view taken along the line 7—7 of FIG. 6.
Figure 8:
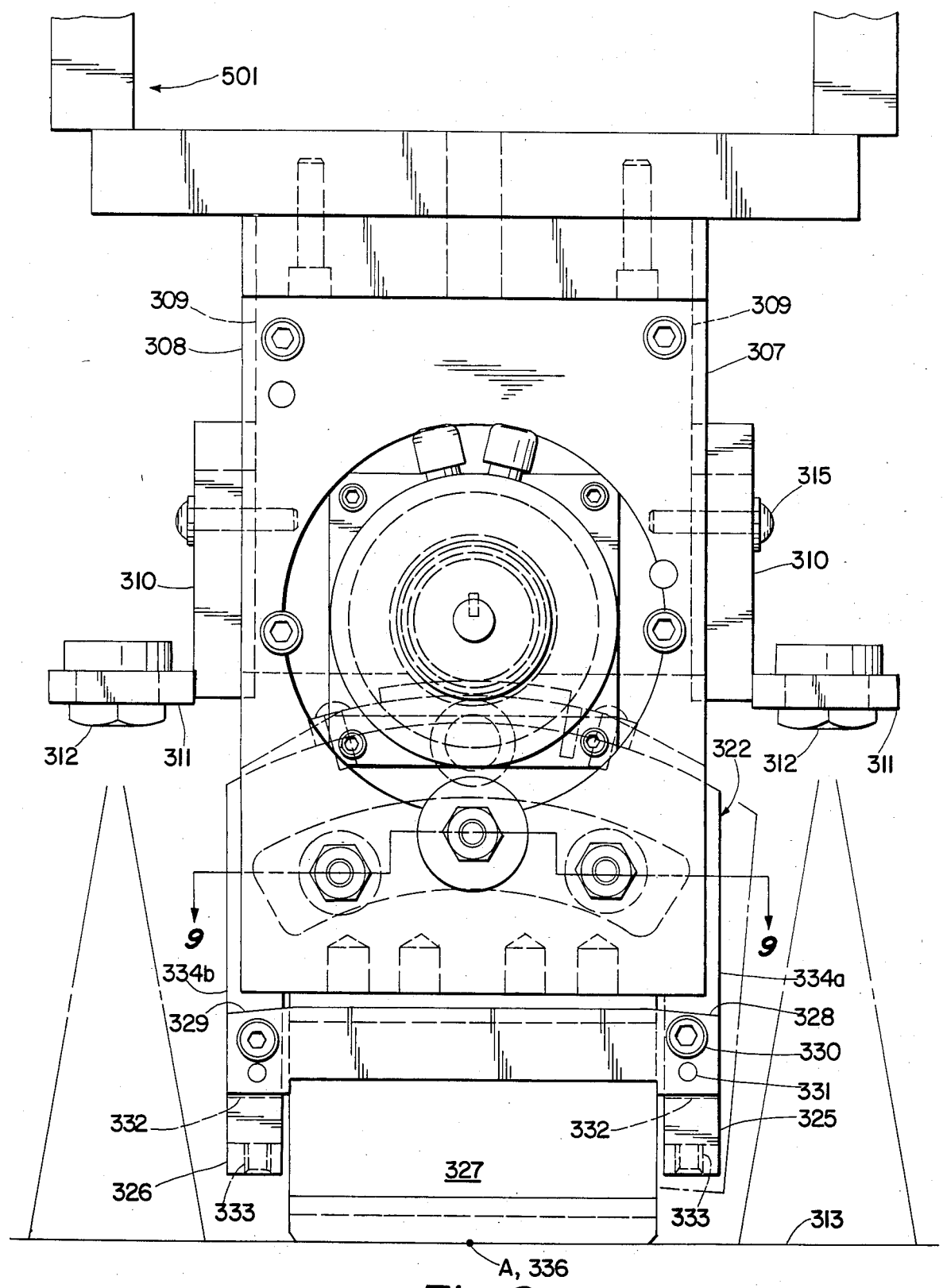
FIG. 8 is a rear view of the tape head presser member taken in the direction of line 8—8 of FIG. 6.

The closeup side elevational view of FIG. 6 shows a horizontal baseplate 300 welded to the lower edge of the plate structure 416 and, instead of the shoe assembly 462 of the prior art device FIG. 2a, an entirely new presser member assembly 301 is bolted to the baseplate 300. The presser member assembly 301 has a T-block 302 secured at the crossbar portion 303 into the baseplate 300 with screws 304 and pins 305. The stem portion 306 of the T-block projects downward. The sides 307,308 of the T-block 302 (see FIGS. 8 and 10) have vertical slots 309 to receive a pair of angle brackets 310. The angle brackets 310 each have a lower horizontal portion 311 which carries a pair of ultrasonic means 312 for sensing the tape laydown surface 313 (mold surface), as the tape laying head 501 descends along the Z-axis. The ultrasonic means 312 indicates the approach distance for satisfactory landing on the surface 313 so that appropriate rapid advance and final feed rates may be employed for a satisfactory landing of the head 501. The brackets 310 have elongated slots 314 with screws 315 received therethrough to adjustably secure the bracket 310 to the T-block 302. The rear face 316 of the stem portion 306 of the T-block 302 is coincident with the rear edge 309a of the side slot 309, and extends down, past the midlength of the T-block 302, to a horizontal surface 317 is machined back to create a second face 318 coincident with the front edge 309b of the slot 309. Thus, the lowermost portion of the T-block 302 extends as a tang 319 from the main stem portion 306. A cover plate 320 is received on the rear face 316, extending for the full length of the T-block 302, and is held in position a plurality of cap screws 321a and pins 321b. The tang 319 and cover plate 320 thus create a bifurcated structure, the inner faces of which are lined with sheets 319a,320a, a suitable antifriction wear material such as solid Teflon, DuPont trademark for polytetrafluoroethylene (PTFE) plastic material and having the planar profile depicted in FIG. 7. After cementing the sheets 319a,320a, in position, the sheets 319a,320a are machined to a precise assembly tolerance. Further references to the tang 319 and cover plate 320 are with the understanding that the sheets 319a,320a are integral therewith.

Figure 10:
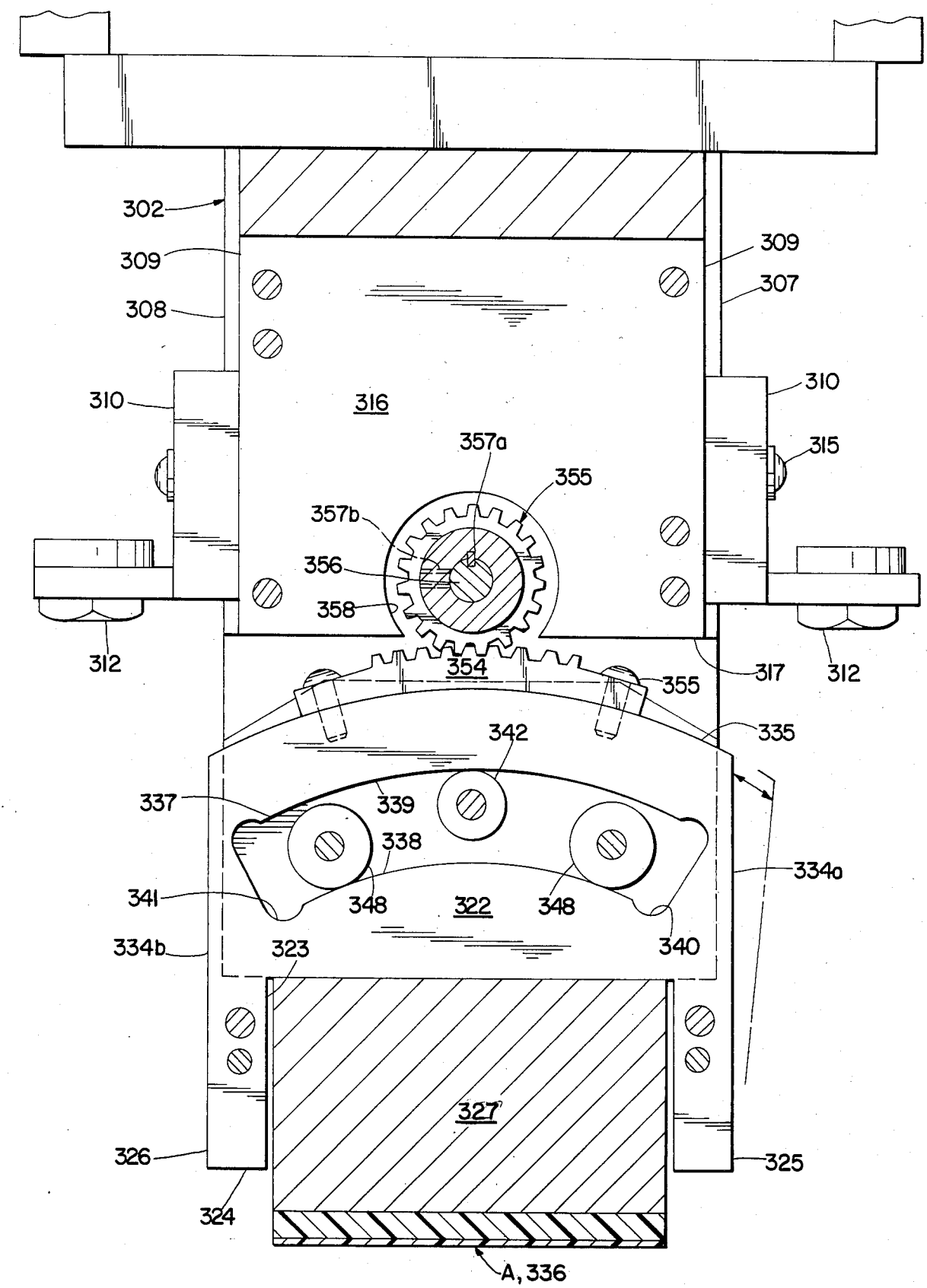
FIG. 10 is a rear elevational section view taken along the line 10—10 of FIG. 6.

A cam plate 322 of constant thickness is slidably sandwiched between the tang 319 and cover plate 320. As shown in FIG. 10, the cam plate 322 has a large rectangular slot 323 machined into its bottom face 324, creating a pair of side legs 325,326. A solid presser shoe 327 is fitted into the slot 323, and side extensions 328,329 of the shoe 327 are fastened to the cam plate legs 325,326 by screws 330 and pins 331. As seen in both FIG. 6 and the sectional view of FIG. 11, the presser shoe 327 has an overall, generally triangular-shaped cross-section with a downwardly pointing apex, where the apex is rounded slightly to smoothly rub a strip of composite tape 19 against the tape laydown surface 313. The tape guide chute assembly 467a leads the composite tape structure 110 to the presser shoe 327. While the presser shoe 327 may be constructed of a single material, in the preferred embodiment the shoe 327 is a composite construction formed of an aluminum base 327a, having a compliant silicone rubber sheet 327b bonded thereto. The sheet 327b is faced with a thin antifriction skin 327c such as adhesive-backed Teflon PTFE plastic fabric, shown greatly exaggerated. The cam plate legs 325,326 are also provided with a pair of horizontal in-line bores 332 with side set screws 333 to mount the axle of a presser roller (not shown) in lieu of the friction shoe, known in the art as substitutes.

Figure 9:
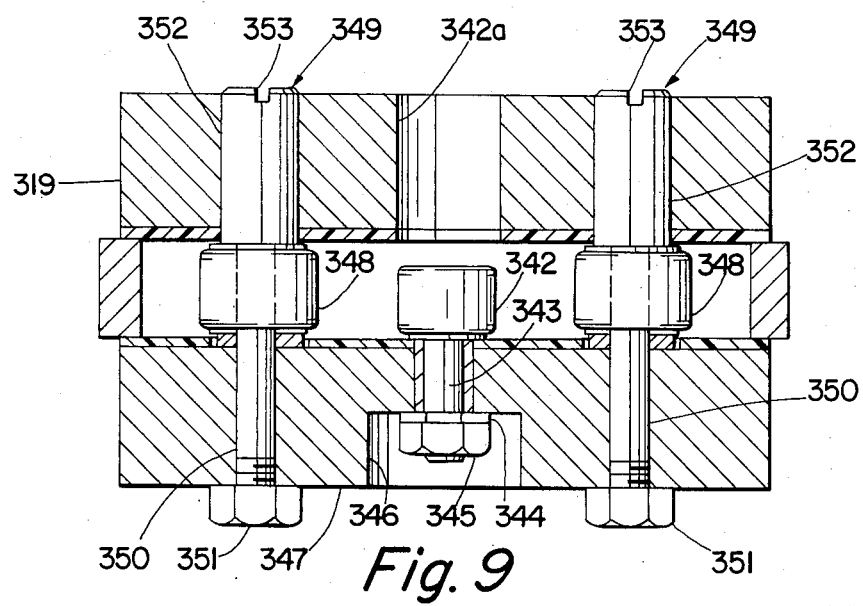
FIG. 9 is a plan section taken through the tape presser member along the line 9—9 of FIG. 8.

Referring to FIG. 10, the cam plate 322 is depicted as having straight sides 334a,b extending slightly beyond the width of the T-block 302, and the top of the cam plate 322 is a circular face 335 having a radius swung from the intersection point 336 corresponding to the centerline of the cam plate 322 and the tape surface 313. The cam plate 322 has a cam track 337 machined therethrough, comprising parallel inner and outer track faces 338,339 which are likewise swung from the common point 336. The inner and outer faces 338,339 subtend a common arc, and terminate at end relief portions 340,341. Referring to FIG. 9 in conjunction with FIG. 10, the outer track face 339 is supported on an antifriction cam follower 342, journalled on a stud 343 received in the cover plate 320. The cam follower stud 343 is affixed to the plate 320 by a lock washer 344 and nut 345 seated in a counterbore 346 in the cover plate face 347. An in-line access hole 342a is provided through the T-block tang 319. The inner track face 338 is supported on a pair of antifriction cam followers 348 which are carried on identical elongated shafts 349 mounted to either side of the central cam follower 342. The twin cam follower shafts 349 each have a stud portion 350 extending through the cover plate 320 and secured thereto by a locknut 351, while the enlarged head 352 of the shaft 349 is received through the T-block tang 319 and has an end screwdriver slot 353 machined therein for countertorquing the shaft 349 while tightening the locknut 351. The cam follower 342 is slightly eccentric to the stud 343 so that all shake may be removed from the assembly, while the twin shafts 349 and concentric cam followers 348 will solidly load the cam plate 327 in a downward direction during a tape laying operation. Therefore, as shown in FIG. 10, the cam plate track 337 is provided with a three point antifriction suspension. The contour changes experienced by the presser shoe 327 will thus cause the cam plate 322 to rock from side-to-side about the common radius point 336, and, to signal a contour change and thereby effect pivoting of the complete tape head 501 about the common radius point 336, a feedback signal is generated by the following mechanism.

Figure 14:
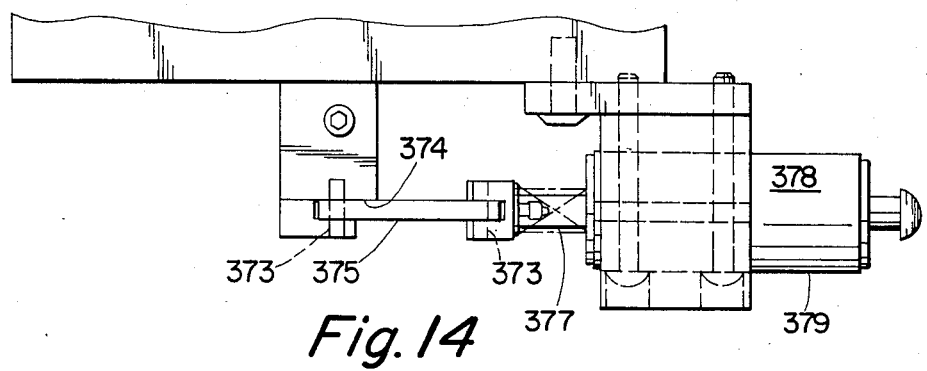
FIG. 14 is a plan view taken along the line 14—14 of FIG. 13.

The circular top face 335 of the cam plate 322 has a gear segment 354 affixed thereto by a pair of buttonhead screws 355, and the gear segment 354 is in mesh with an upper pinion 355. The pinion 355 is carried on a pinion shaft 356 and is held by means of a key 357a and a side set screw 357b. A counterbored relief 358 is machined into the face 316 of the T-block 302 to provide clearance around the pinion 355. Referring to the sectional view of FIG. 11, the pinion shaft 356 is carried in a pair of bearings 359, the first of which is mounted in a bearing bore 360 in the T-block 302, and the second of which is carried in a bearing retainer plate 361 which is, in turn, mounted in a counterbore 362 in the cover plate 320 and held therewith by a plurality of cap screws 363. The bearing retainer plate 361 has a pilot diameter 362a mounted in a close-fitting bore 363a extending through the cover plate 320. Spacer rings 364,365 are received on the shaft 356 between the pinion 355 and bearings 359 respectively, and a pair of retaining rings 366 are clipped to the shaft 356 to prevent axial movement relative to the bearings 359. The front end of the pinion shaft 356 extends through the T-block bearing bore 360 and a clearance counterbore 367 machined in the front face 368 thereof. The pinion shaft 356 is reduced to a smaller front end diameter 369 which terminates outside the T-block 302. The reduced diameter 369 carries an eccentric clevis mounting block 370 which is generally rectangular in cross-section and has a bore 371 machined into one end to be received on the reduced diameter 369 of the pinion shaft 356. The block 302 is secured to the shaft 356 by a set screw 372. The outer end of the block 370 contains a pin 373 which is eccentric to the pinion shaft 356, thereby causing the pin 373 to act in a crankshaft fashion as the pinion shaft 356 is rotated. The pin 373 passes through a slot 374 in the side of the eccentric block 370 and, with reference also to FIGS. 13 and 14 in conjunction with the sectional view of FIG. 11, a link 375 is received in the side slot 374 of the eccentric block 370 and is journalled on the eccentric pin 373. The other end of the link 375 is clevis-mounted with a pin 376 to the core 377 of an LVDT 378 (linear variable differential transducer). The circular body 379 of the LVDT 378 is received in the bore 380 of a transducer mounting block 381. The mounting block 381 has a saw slot 382 extending from the bottom face to the bore 380, and a side screw 383 serves to provide a frictional clamping force on the LVDT body 379. A pair of longer screws 384 are received through the mounting block 381 to affix the block 381 to a mounting plate 385. The mounting plate 385, in turn, is attached to the front face 368 of the T-block 302 by a pair of buttonhead screws 386. Thus, it can be seen in FIG. 13, that as the pinion shaft 356 is rotated in clockwise or counterclockwise directions by presser shoe movement, the core 377 of the LVDT 378 will be shifted linearly by the crank pin 373.

Figures 11, 12:
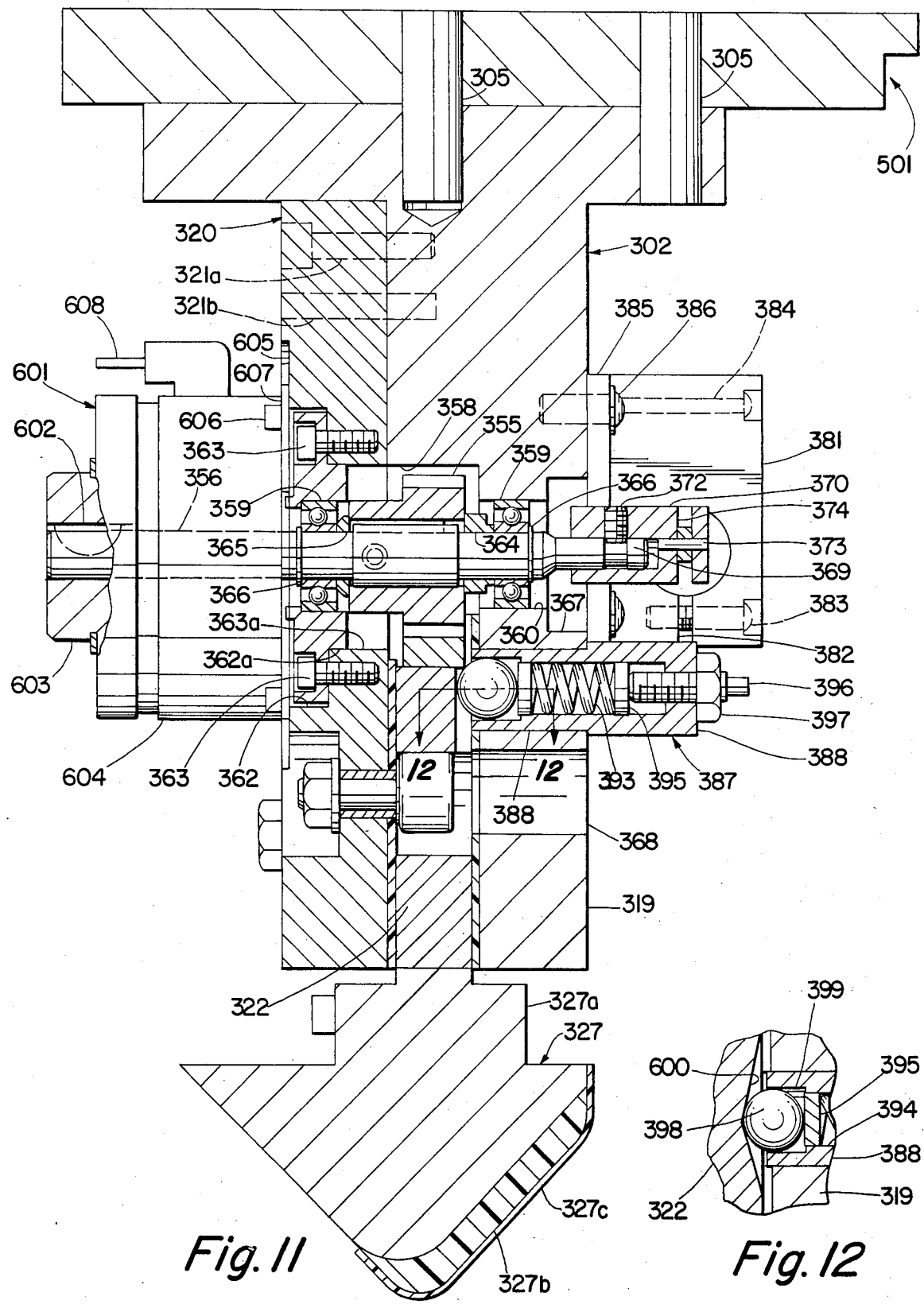
FIG. 11 is a side elevational section taken through the presser member along the line 11—11 of FIG. 8.
FIG. 12 is a plan section taken along the line 12—12 of FIG. 11.
Figure 13:
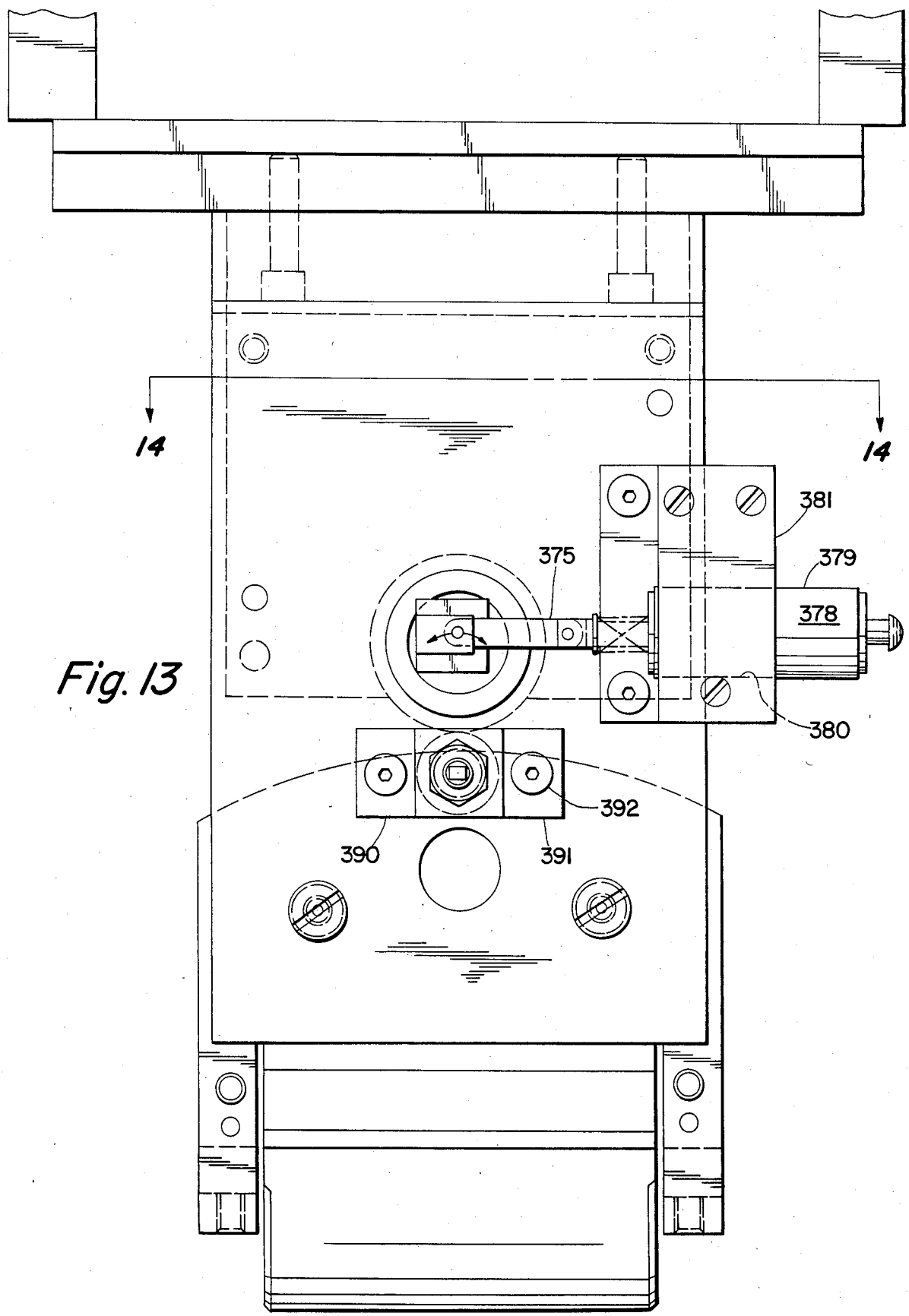
FIG. 13 is a front elevational view taken along the line 13—13 of FIG. 6.

Referring to FIGS. 11, 12, and 13, a detent assembly 387 is mounted to the T-block 302, and serves to bias the cam plate 322 to a vertical, or upright, normal position. The detent assembly 387 has a body 388 with a pilot diameter 389 extending through the tang 319 of the T-block 302. Side-extending lugs 390,391 on the body 388 are affixed to the T-block 302 by a pair of screws 392. A compression spring 393 received within a central hole 394 in the body 388 is loaded against a pair of thrust disks 395. The front thrust disk 395 is in contact with an adjusting screw 396 positionably held in the body by a locknut 397, and the rear thrust disk 395 abuts a smooth, solid ball 398 received in a close-fitting end bore 399. The ball 398 engages a shallow V-notch 600 having its valley extending vertically on the cam plate 322 from the top surface 335 to the cam track 339.

The structure described thus far is sufficient to provide feedback signals to indicate the rotation of the presser shoe 327, and to thereby effect rotation of the entire tape head 501 around the common radius point 336 to realign the head 501 and shoe 327, but the invention embodies an additional inventive feature which is useful for preventing rotation of the presser shoe 327 at certain predetermined times. As an example, when the presser shoe 327 is working near the extreme edge of a mold laydown surface, the downward forces may tend to cause the shoe 327 to pivot around the corner of a mold, leaving the laydown surface. It is thus preferrable at such time inhibit the shoe rotation.

As shown in FIG. 11, the rear extension of the pinion shaft 356 extends through an electronic brake assembly 601. The pinion shaft 356 is fitted with a key 602 engageable with the rotor 603 of the brake assembly 601. While the stator 604 is affixed to a shallow counterface 605 machined in the cover plate 320, and a plurality of cap screws 606 are provided through the flange 607 of stator 604. Electrical leads 608 are connected from a suitable control source to the stator windings, so that, at predetermined times, the brake assembly 601 may be energized and rotation of the pinion 355 thus inhibited.

While the invention has been shown in conjunction with a preferred embodiment, it is not intended that the invention be so limited, but rather, the invention extends to all such designs and modifications as come within the scope of the appended claims.

What is claimed is:

1. In a laminating machine of the type having a head with presser member that presses a strip of material against a contoured surface to apply it to the surface along a path, the machine including means for mounting the head for pivotal movement about the path and where the head and presser member are aligned along a common line substantially normal to the path and passing through a point on the path, apparatus for mounting the presser member for pivotal movement about the path, said apparatus comprising:

arcuate cam means for connecting the presser member to the head and for allowing pivotal movement of the presser member about an axis parallel to said path and passing through said point, the presser member pivotal movement being independent of the head pivotal movement; and means for realigning the head with the presser member after said member is pivoted about said axis.

2. The apparatus of claim 1, in which said point is located essentially midway between the lateral edges of the path.

3. The apparatus of claim 1, in which the presser member presses said strip against said surface along a contact line, and said point is located on said contact line.

4. The apparatus of claim 3, in which said point is located at essentially the midpoint of said contact line.

5. The apparatus of claim 1, wherein said means for realigning the head includes a head drive means cooperating with a presser member position sensing means.

6. The apparatus of claim 1, further including braking means for selectively inhibiting pivotal movement of said presser member.

7. In a laminating machine having a head with a presser member that presses a strip of material against a contoured surface to apply it to the surface along a path, and where the head and presser member are aligned along a common line substantially normal to the path and passing through a point on the path, apparatus for orienting the head and presser member to the path, said apparatus comprising:

a first circular track and first track guide means for connecting the machine to the head and for allowing rotary movement of the head about the path;

a second circular track and second track guide means for connecting the head to the presser member and for allowing rotary movement of the presser member about the path, independent of the rotary head movement, said first and second tracks being concentric with one another about the path; and means for realigning the head with the presser member along said line after rotary movement.

8. The apparatus of claim 7, wherein said means for realigning includes drive means for positioning said head and feedback means for sensing the position of said presser member.

9. The apparatus of claim 7, further including braking means for selectively inhibiting rotary movement of said presser member.

* * * * *